US008333900B1

(12) United States Patent
Boussaad et al.

(10) Patent No.: US 8,333,900 B1
(45) Date of Patent: Dec. 18, 2012

(54) SELECTIVE ETCHING OF SINGLE WALLED CARBON NANOTUBES

(75) Inventors: Salah Boussaad, Wilmington, DE (US); Frank M. Pellicone, North East, MD (US); Joseph Menezes, Wilmington, DE (US)

(73) Assignee: E I du Pont de Nemours and Company, Wilmington, DE (US)

( * ) Notice: Subject to any disclaimer, the term of this patent is extended or adjusted under 35 U.S.C. 154(b) by 783 days.

(21) Appl. No.: 12/493,459

(22) Filed: Jun. 29, 2009

Related U.S. Application Data

(60) Provisional application No. 61/076,150, filed on Jun. 27, 2008.

(51) Int. Cl.
*C23F 3/00* (2006.01)

(52) U.S. Cl. .......................... 216/81; 977/742; 977/750

(58) Field of Classification Search .................... 216/81; 977/742, 750
See application file for complete search history.

(56) References Cited

U.S. PATENT DOCUMENTS

| | | | |
|---|---|---|---|
| 5,346,683 A | 9/1994 | Green et al. | |
| 7,498,423 B2 | 3/2009 | Zheng et al. | |
| 2002/0102193 A1* | 8/2002 | Smalley et al. | 422/190 |
| 2002/0102194 A1* | 8/2002 | Smalley et al. | 422/190 |
| 2003/0042128 A1* | 3/2003 | Harutyunyan et al. | 204/158.2 |
| 2004/0115345 A1 | 6/2004 | Huang et al. | |
| 2009/0121219 A1* | 5/2009 | Song et al. | 257/43 |
| 2010/0254886 A1* | 10/2010 | McElrath et al. | 423/447.2 |
| 2011/0104492 A1* | 5/2011 | Muhler et al. | 428/375 |
| 2011/0198559 A1* | 8/2011 | Wang et al. | 257/9 |

FOREIGN PATENT DOCUMENTS

WO WO2004/048256 A3 6/2004

OTHER PUBLICATIONS

A. Hassanien et al., Selective etching of metallic single-wall carbon nanotubes with hydrogen plasma, Nanotechnology (2005) vol. 16, pp. 278-281, Institute of Physics Publishing (UK).

Guangyu Zhang et al., Hydrogenation and Hydrocarbonation and Etching of Single-Walled Carbon Nanotubes, J. Am. Chem. Soc., (2006) vol. 128, pp. 6026-6027, (Published on the Web Feb. 23, 2006).

Kwanyong Seo et al., Tuning Chirality of Single-Wall Carbon Nanotubes by Selective Etching with Carbon Dioxide, J. Am. Chem. Soc. (2003) vol. 125, pp. 13946-13947, (Published on the Web Oct. 28, 2003).

Andreas Thess et al., Crystalline Ropes of Metallic Carbon Nanotubes, Science (1996) vol. 273, pp. 483.

C. Journet et al., Large-scale production of single-walled carbon nanotubes by the electric-arc technique, Nature (1997), vol. 388, pp. 756, Macmillian Publishers Ltd.

Pavel Nikolaev et al., Gas-phase catalytic growth of single-walled carbon nanotubes from carbon monoxide, Chemical Physics Letters (1999) vol. 313, pp. 91-97, (Published by: Elsevier Science B.V.).

Jing Kong et al., Chemical vapor deposition of methane for single-walled carbon nanotubes, Chemical Physical Letters (1998).

(Continued)

*Primary Examiner* — Binh X Tran
(74) *Attorney, Agent, or Firm* — Kevin S. Dobson

(57) ABSTRACT

Described is a method for the selective etching of single walled carbon nanotubes with $CO_2$ where nanotubes of small diameters are removed.

11 Claims, 6 Drawing Sheets

OTHER PUBLICATIONS

Alan M. Cassell et al., Large Scale CVD Synthesis of Single-Walled Carbon Nanotubes, J. Phys. Chem. B (1999) vol. 103, pp. 6484-6492.

Hongjie Dai et al., Controlled Chemical Routes to Nanotube Architectures, Physics, and Devices, J. Phys. Chem. B (1999) vol. 103, pp. 11246-11255.

Yan Li et al., Preparation of Monodispersed Fe-Mo Nanoparticles as the Catalyst for CVD Synthesis of Carbon Nanotubes, Chem. Mater. (2001) vol. 13, pp. 1008-1014.

Alan M. Cassell et al., Directed Growth of Free-Standing Single-Walled Carbon Nanotubes, J. Am. Chem. Soc. (1999), vol. 121, pp. 7975-7976.

Jie Liu et al., Fullerene Pipes, Science (1998) vol. 280, p. 1253.

Michael J. O'Connell et al., Reversible water-solubilization of single-walled carbon nanotubes by polymer wrapping, Chemical Physics Letters (2001) vol. 342, p. 265.

Shunji Bandow et al., Purification of Single-Wall Carbon Nanotubes by Microfiltration, J. Phys. Chem. B (1997) vol. 101, p. 8839.

Jian Chen et al., Solution Properties of Single-Walled Carbon Nanotubes, Science (1998) p. 95.

G. S. Duesberg et al., Chromatographic size separation of single-walled carbon nanotubes, Appl. Phys. A. (1998) vol. 67, p. 117.

A. B. Dalton et al., Selective Interaction of a Semiconjugated Organic Polymer with Single-Wall Nanotubes, J. Phys. Chem. B (2000) vol. 104, p. 10012.

A. B. Dalton et al., A functional conjugated polymer to process, purify and selectively interact with single wall carbon nanotubes, Synthetic Metals (2001) vol. 121, p. 1217.

Rajdip Bandyopadhyaya et al., Stabilization of Individual Carbon Nanotubes in Aqueous Solutions, NANO Letters (2001) vol. 2, No. 1, p. 25.

Jun Wang et al., Nanotubes, Nanowires, and Nanocantilevers in Biosensor Development, Nanotechnologies for the Life Sciences (2007) Wiley-VCH Verlag GmbH&Co. KGaA (Germany)—DOI: 10.1002/9783527610419.NTLS0084.

Ming Zheng et al., Structure-Based Carbon Nanotube Sorting by Sequence-Dependent DNA Assembly, Science (2003) vol. 302, pp. 1545-1548.

Robert Seidel et al., Chemical Vapor Deposition Growth of Single Walled Carbon Nanotubes at 600 Degrees Celcius and a Simple Growth Model, J. Phys. Chem. B (2004), vol. 108, pp. 1888-1893.

* cited by examiner t = 0 min t = 30 min

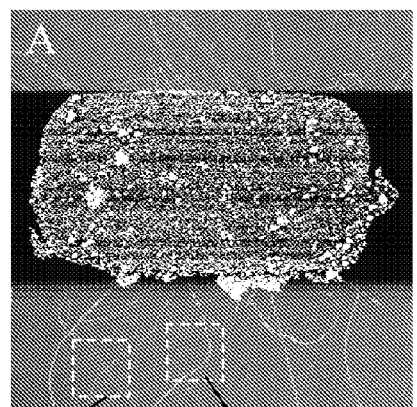
FIG. 4A
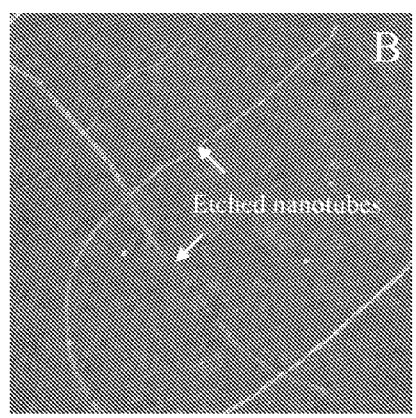 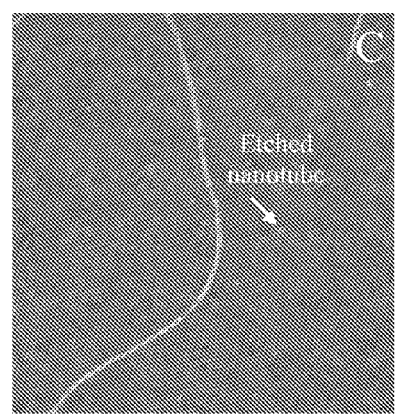
FIG. 4B FIG. 4C

SELECTIVE ETCHING OF SINGLE WALLED CARBON NANOTUBES

FIELD OF INVENTION

Disclosed herein is a method for the selective etching of single walled carbon nanotubes.

BACKGROUND OF THE INVENTION

Carbon nanotubes (CNT) have been the subject of intense research since their discovery in 1991. CNTs possess unique properties such as high surface to volume ratio and high electrical conductivity, which makes them suitable in a wide range of applications, including use as structural materials in molecular electronics, nanoelectronic components, and field emission displays. Carbon nanotubes may be either multi-walled (MWNTs) or single-walled (SWNTs), and have diameters in the nanometer range.

Because of their size and electronic properties, nanotubes show promise as components of nano-scale electronic devices. However, nanotubes are produced in a wide distribution of diameters and chiralities. Larger diameter nanotubes are generally more suitable for use as interconnects in such devices. Therefore, a method to isolate nanotubes of a minimum size is needed.

Hassanien et al (Nanotechnology, 16, (2005), 278-281) and Zhang et al (JACS 128, (2006), 6026-7) describe the reductive etching and cutting of SWNTs using hydrogen and hydrocarbon plasmas. Oxidative treatment of CNTs have been performed by several researchers. Seo et al (JACS 125, (2005) p13946-7) demonstrated that under their conditions $CO_2$ attacks preferentially zigzag nanotube edges, therefore selecting for armchair nanotubes. Green et al (U.S. Pat. No. 5,346,683) reacted MWNTs with $CO_2$ and other gasses and demonstrated that the gas reacted with the capped regions of the nanotubes only.

Applicants have discovered a method to remove any type of SWNT of specified diameters using $CO_2$.

SUMMARY OF THE INVENTION

The invention provides methods for the production of populations of SWNTs having a minimum diameter. The method involves the etching of a population of SWNTs having varying diameters in the presences of heat and CO2. Applicants have discovered that this process selectively etches smaller diameter tubes before larger ones. Hence by varying the time and temperature of the process it is possible to selectively product populations of SWNTs having a specific minimum diameter.

Accordingly the invention provides a method, for the production of a population of single-walled nanotubes having a minimum diameter comprising:
 a) placing a plurality of single walled carbon nanotubes of varying diameters under an inert atmosphere;
 b) heating the single walled carbon nanotubes to a temperature of about 350° C. to about 900° C.;
 c) adding carbon dioxide to the inert atmosphere until the atmosphere contains at least 10% carbon dioxide; and
 d) maintaining the temperature until only single walled carbon nanotubes of having a minimum diameter remain.

In another embodiment the invention provides a population of single walled nanotubes prepared by the methods of the invention.

BRIEF DESCRIPTION OF THE FIGURES

FIGS. 4 (A)-(C) are tapping-mode AFM images of the same nanotubes after etching with $CO_2$ at high temperatures.

FIG. 5 (D) is an AFM image of the same nanotubes after treatment with $CO_2$.

DETAILED DESCRIPTION OF THE INVENTION

Figure 1:
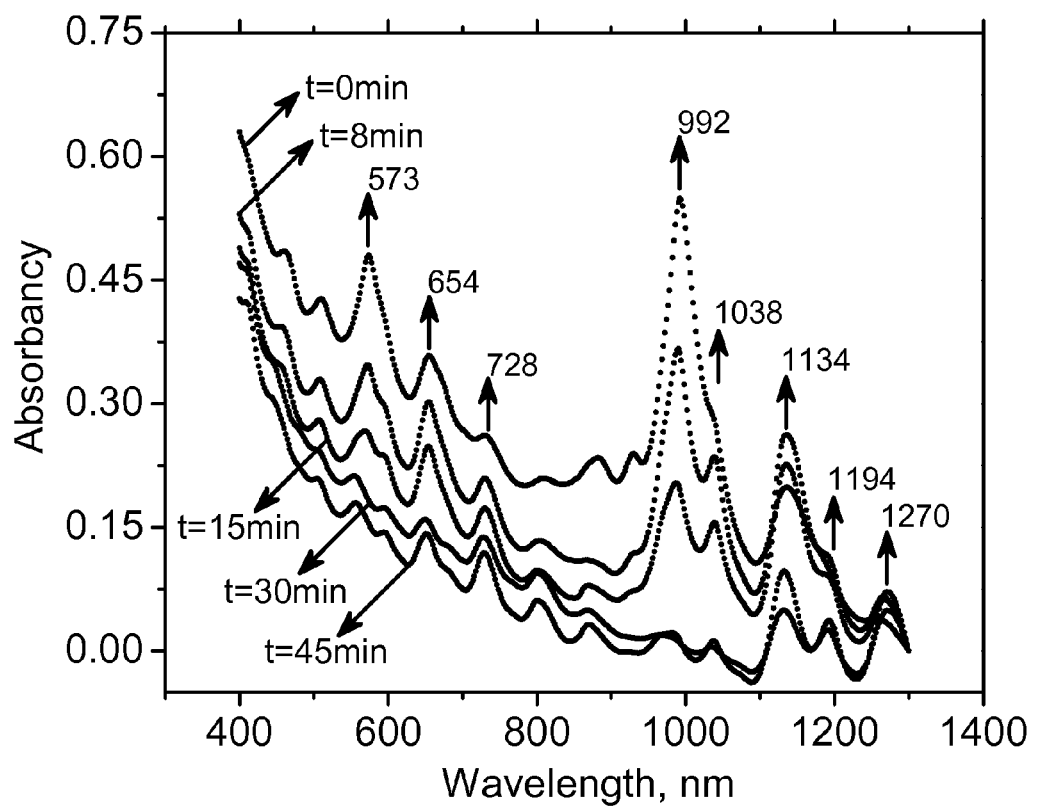
FIG. 1 is an absorption spectra of etched SWNTs dissolved in water using DNA.

The invention provides methods of preparing populations of SWNTs having a minimum diameter. The process is useful for removing smaller diameter SWNTs which have less value in the fabrication of nano-devices.

SWNTs of the invention may be used in conducting nano devices for use in electronic applications such as field-emission transistors, artificial actuators, molecular-filtration membranes, energy-absorbing materials, molecular transistors, and other optoelectronic devices as well as in gas storage, single-electron devices, and chemical and biological sensors.

In this disclosure, a number of terms and abbreviations are used. The following definitions are provided.
 "MWNT" means Multi-walled nanotube
 "SWNT" means Single walled nanotube
 "CNT" means carbon nanotube
 The term "solid substrate" means a material to which a carbon nanotube or binding peptide may be affixed either by direct chemical means or via an intermediate material such as a coating.
 "Atomic Force Microscopic" will be abbreviated "AFM".
 The term "inert atmosphere" will refer to a gaseous reaction environment substantially devoid of materials and compounds that would react with the surface of a SWNT. Typically such environments contain gases such as Ar and N and are devoid of oxygen and other reactive molecules.

The invention provides for the production of a population of single-walled nanotubes having a minimum diameter comprising placing a plurality of single walled carbon nanotubes of varying diameters under an inert atmosphere; heating the single walled carbon nanotubes to a temperature of about 350° C. to about 900° C.; adding carbon dioxide to the inert atmosphere until the atmosphere contains at least 10% carbon dioxide; and maintaining the temperature until only single walled carbon nanotubes of having a minimum diameter remain. Optionally the population of SWNTs prepared in this fashion may be isolated by means well known in the art and used in the fabrication of nano-devices.

The term "carbon nanotube" refers to a hollow article composed primarily of carbon atoms. The carbon nanotube (CNT) can be doped with other elements, e.g., metals. The nanotubes typically have a narrow dimension (diameter) of about 1-200 nm and a long dimension (length), where the ratio of the long dimension to the narrow dimension, i.e., the aspect ratio, is at least 5. In general, the aspect ratio is between 10 and 2000. Carbon nanotubes can be either multi-walled nanotubes (MWNTs) or single-walled nanotubes (SWNTs). A MWNT, for example, includes several concentric nanotubes each having a different diameter. Thus, the smallest diameter tube is encapsulated by a larger diameter tube, which in turn, is encapsulated by another larger diameter nanotube. A SWNT, on the other hand, includes only one nanotube. One particular variety of nanotube is an armchair nanotube which is metallic in nature differs from other SWNT in its conformation.

Carbon nanotubes (CNT) may be produced by a variety of methods, and are additionally commercially available. Methods of CNT synthesis include laser vaporization of graphite (A. Thess et al. Science 273, 483 (1996)), arc discharge (C. Journet et al., Nature 388, 756 (1997)) and HiPC (high pressure carbon monoxide) process (P. Nikolaev et al. Chem. Phys. Lett. 313, 91-97 (1999)). Chemical vapor deposition (CVD) can also be used in producing carbon nanotubes (J. Kong et al. Chem. Phys. Lett. 292, 567-574 (1998); J. Kong et al. Nature 395, 878-879 (1998); A. Cassell et al. J. Phys. Chem. 103, 6484-6492 (1999); H. Dai et al. J. Phys. Chem. 103, 11246-11255 (1999)).

Additionally CNT's may be grown via catalytic processes both in solution and on solid substrates (Yan Li, et al., Chem. Mater.; 2001; 13(3); 1008-1014); (N. Franklin and H. Dai Adv. Mater. 12, 890 (2000); A. Cassell et al. J. Am. Chem. Soc. 121, 7975-7976 (1999)).

The SWNTs used in the method disclosed herein can be in any form, such as powdered or in solution or suspension form. They are placed, typically on a solid substrate, which can be, but is not limited to silica, quartz, and alumina, and is under an inert atmosphere. The inert atmosphere can be any substantially inert gas or gas mixture, but is typically argon or nitrogen.

Placement of the SWNTs on a solid substrate is well understood by those of the skill in the art. Solid substrates are comprised of materials which include but are not limited to silicon, silicon dioxide, glass, metal, metal oxide, metal alloy, polymers ceramics crystals and combinations thereof. Particularly suitable substrates will be comprised of for example, quartz glass, alumina, graphite, mica, mesoporous silica, silicon wafer, nanoporous alumina, and ceramic plates. Preferably, the substrate is quartz glass or silicon wafer.

Optionally it may be useful to prepare the surface of the solid substrate so that it will better receive and bind the SWNTs. For example the solid substrate may be micro-etched or may be coated with materials for better nano-structure adhesion and alignment. Materials suitable for coating the substrate include, but are not limited to metal oxides (e.g., Al2O3, TiO2, and MgO), metal carbides, metal nitrides, metal sulfides, metal borides, gallium arsenide, aluminum arsenide, aluminum sulfide, gallium sulfide, surfactants, proteins and combinations thereof.

Typically placement of the SWNTs on the solid substrate is accomplished by first admixing the SWNTs with a dispersant material or polymer. Suitable dispersants are those that will allow for an even distribution of SWNTs and which will cure or dry forming a firm layer in response to heat.

A dispersant can be any solvent or coating which is capable of spreading and spatially fixing the objects to be cut, for example a collection of nanotubes to be cut, on a substrate. The dispersant optionally serves as a suspension medium for the objects to be cut, spreads the objects to be cut on the substrate. For example coating of the substrate may be accomplished by spin-coating, followed by baking, and then cooling of the substrate. Where dispersants are solvents they may optionally be evaporated away after the coating process. Low viscosity solvents have certain advantages over polymeric type dispersants. Low viscosity dispersants such as dichlorobenzene/chloroform may be evaporated off the surface of the substrate leaving a mat of nanotubes that are more precisely cut than where the nanotubes are embedded in a polymeric material.

Solvent dispersants useful in the invention include but are not limited to substituted benzenes (e.g. dichlorobenzene) and/or mixtures of solvents as for example dichlorobenzene/chloroform and chloroform and dimethylformamide. Additionally various surfactants may be used as dispersants, including but not limited to Triton™ X100 and also Tergitol™ TMN-6 (Union Carbide, Danbury, Conn.).

Typically the SWNTs are suspended in the dispersant and spin coated on the surface of the solid substrate. In some cases it may be necessary to sonicate the nano-structures for suspension in the dispersant. In a preferred embodiment it may be desirable to disperse nanotubes prior to their coating on the substrate. Typically, nanotubes take the form of "rope" which aggregations of highly polarized, nanotubes which readily form parallel bundles or ropes with a large van der Waals binding energy. Some separation of the ropes occurs when nanotubes are placed in a dispersant solution, however additional dispersion may be useful to effect more precise cutting. Methods of dispersing nanotube ropes are known in the art and generally involve sonication or the use of surfactants (J. Liu et al., Science 280, 1253 (1998); M. J. O'Connell et al., Chem. Phys. Lett. 342, 265 (2001); S. Bandow et al., J. Phys. Chem. B 101, 8839 (1997); J. Chen et al., Science 282, 95 (1998); G. S. Duesberg, J. Muster, V. Krstic, M. Burghard, S. Roth, Appl. Phys. A 67, 117 (1998); A. B. Dalton et al., J. Phys. Chem. B 104, 10012 (2000); A. B. Dalton et al., Synth. Metals 121, 1217 (2001); R. Bandyopadhyaya, E. Nativ-Roth, O. Regev, R. Yerushalmi-Rozen, Nano Lett. 2, 25 (2002)). Additionally Applicants have disclosed in co-pending U.S. Provisional application Ser. No. 10/716,346 a method for dispersion of nanotube ropes involving associating the ropes with DNA fragments.

After placement on the substrate, the SWNT are heated to a temperature of about above 300° C. where 350° C. to about 900° C. is preferred and about 480° C. to about 900° C. is most preferred. The method of heating can be any known in the art but typically a furnace, such as a quartz furnace. After the desired temperature is achieved, carbon dioxide is added to the inert atmosphere until the atmosphere contains at least 10% carbon dioxide. The temperature is maintained until only single walled carbon nanotubes of the desired diameter remain, typically for between 10 and 60 minutes.

The diameters that are removed by the method disclosed herein are determined by the combination of temperature and time. Although not wishing to be bound by theory, it is believed that the CNTs are removed via the decomposition of carbon dioxide to yield carbon monoxide, leading to consumption, or etching, of carbon from the nanotubes. Because of their small diameters the structure of small diameter SWNTs are stressed more than that of large diameter SWNT, and thus are etched more quickly. Typically, the method disclosed herein will remove SWNTs with diameters equal to or less than 2 nm.

In order to avoid oxidation of the SWNT when oxygen is present at levels of more than $1\times10^{-8}$ torr ($1.33\times10^{-5}$ Pa), water should be present, typically at levels of least 1%, or no more than 10%.

The method disclosed herein can additionally comprise the step of isolating the single walled carbon nanotubes of the desired diameter after step d). This isolation can be performed by any method known in the art. Methods for the separation and recovery of coated nanoparticles by size or diameter are described in U.S. Patent Appl. No. 20040115345. WO2004/

048256 describes methods for the separation and recovery of nanotube-nucleic acid complexes.

Also disclosed is a population of single walled nanotubes prepared by the method disclosed herein. Since small diameter SWNTs have larger bandgaps, a population of nanotubes prepared by this method disclosed herein can be useful as interconnects and sensors in electronic and nano-devices.

Sensors on the micro and nanoscale have applications in various diagnostic and bio-medical applications, and may be used to detect the presence of oxygen, changes in pH, or the presence of a biological analyte. Use of CNTs in sensor and biosensors are reviewed in Nanotechnologies for the Life Sciences, "Nanotubes, Nanowires, and Nanocantilevers in Biosensor Development", Jun Wang et al., 2007 Wiley-VCH Verlag GmbH & Co., DOI: 10.1002/ 9783527610419.ntls0084.

EXAMPLES

The present invention is further defined in the following Examples. It should be understood that these Examples, while indicating preferred embodiments of the invention, are given by way of illustration only. From the above discussion and these Examples, one skilled in the art can ascertain the essential characteristics of this invention, and without departing from the spirit and scope thereof, can make various changes and modifications of the invention to adapt it to various uses and conditions.

The meaning of abbreviations used is as follows: "min" means minute(s), "h" means hour(s), "µL" means microliter(s), "mL" means milliliter(s), "L" means liter(s), "nm" means nanometer(s), "mm" means millimeter(s), "cm" means centimeter(s), "µm" means micrometer(s), "mM" means millimolar, "M" means molar, "mmol" means millimole(s), "µmole" means micromole(s), "g" means gram(s), "µg" means microgram(s), "mg" means milligram(s), "g" means the gravitation constant, "rpm" means revolutions per minute,

Example 1

This example shows the selected reduction in small diameter SWNT when exposed to CO2 etching.

Single-walled carbon nanotubes (SWNT) were purchased from SouthWest NanoTechnologies Inc. (Norman, Okla.). A few mg's of the nanotube powder were placed on a quartz boat which was placed inside a quartz tube furnace. After sealing the tube furnace and flushing with Ar or $N_2$ for few minutes at 1 L/min to reduce the amount of $O_2$ present in the tube furnace atmosphere, the temperature was ramped to 900° C. $CO_2$ was then flowed at 0.138 L/min for 8 min. The procedure was repeated with separate batches for 15, 30 and 45 min. The $CO_2$ gas was turned off at the end of the process and Ar or $N_2$ was allowed in at 1 L/min during the tube furnace cooling to room temperature.

The etched and unetched nanotubes were dissolved in water using GT20 DNA as described in Ming et al. Science 2003, V302 PP 1545-1548. Absorption spectra were then taken of these solutions as described in Ming supra. The results are shown in FIG. 1. The absorption plot of the nanotubes before etching shows many peaks, which are characteristic of various species of nanotubes such as [6,5], [7,5] and [7,6]. After 8 min of etching a decrease in the intensity of peaks characteristic to the [6,5] and [7,5] species is seen, whereas the peaks characteristic to [7,6] stayed unchanged. At 15 min a further decrease is seen in the intensity of the absorption peaks characteristic to the [6,5] and [7,5] species only. The peaks characteristic to [7,6] stayed unchanged. However, at 45 min the peaks characteristic to [6,5] and [7,5] were drastically changed compared to the peaks characteristic to [7,6].

It can be seen that the etching is a diameter-based selective process. The spectroscopy data indicated that nanotubes absorbing at lower wavelength are more reactive than the nanotubes absorbing at longer wavelength. This observation suggests that nanotubes with short diameter are more reactive than the nanotubes with large diameter, which is in agreement with the difference observed between the [6,5]/[7,5] and [7,6] species. It also indicates that this process is not selective to armchair nanotubes.

Example 2

This example provides visual evidence of the reduction in small diameter SWNT when processed by the methods of the invention.

Figure 2A:
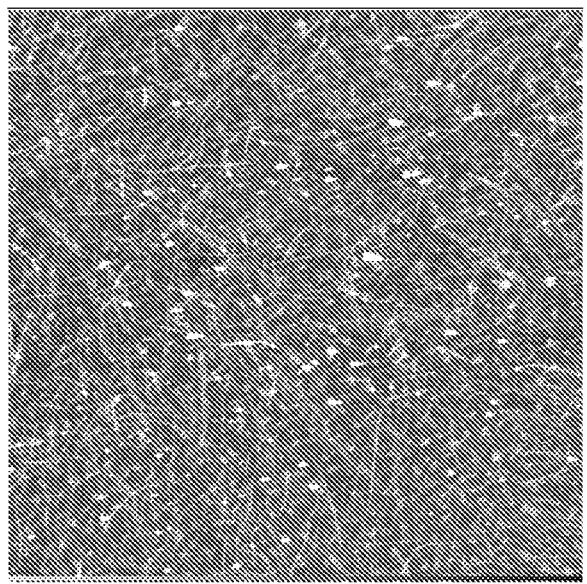
FIG. 2 is a tapping mode AFM images of silicon surface after 10 min incubation of nanotubes solution before (t=0 min) and after etching (t=30 min).
Figure 2B:
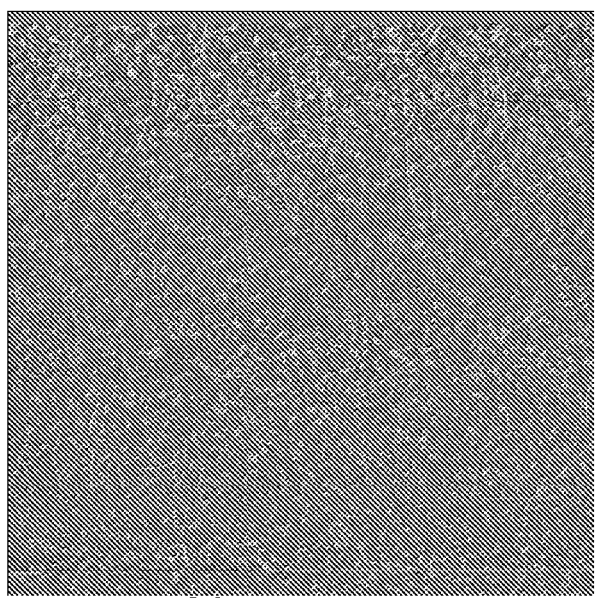

Small drops (~20 µL) were deposited on a clean silicon substrate from the solution of suspended SWNT in water from Example 1, containing SWNT both before $CO_2$ etching and after 30 min-$CO_2$ etching. The AFM (atomic force microscopy) images in FIG. 2 show those intact nanotubes (before etching) to form networks on the surface but only a few short nanotubes scattered on the surface for those etched for 30 min with $CO_2$ at 900° C.

Example 3

This example demonstrates that SWNT produced by Chemical vapor deposition show the same tendency for reduction in small diameter SWNT as those provided commercially.

Chemical vapor deposition (CVD) was used to grow single-walled carbon nanotubes (SWNT) from iron based catalyst islands, as described in R. Seidel et al. Journal of Physical Chemistry B 2004 V108 PP1888-1893. After the CVD growth, the catalyst island was imaged with tapping-mode AFM to visualize the nanotubes. The resulting image (14×14 µm) in FIG. 3(A-C) shows the catalyst island with the nanotubes before etching with $CO_2$ gas at 700° C. The nanotubes on the silicon chip were next placed in a 2" diameter quartz tube furnace. The quartz tube was heated to 700° C. in 30 minutes under a constant flow of argon (UHP grade) at 1 L/min. At 700° C., the $CO_2$ (scientific grade) gas was then introduced into the tube furnace at 0.5 L/min for 10 minutes. The tube furnace was then cooled to room temperature under a constant flow of argon at 1 L/min. The silicon chip was removed from the quartz tube furnace and imaged again with AFM on the same areas to determine the impact of $CO_2$ on the nanotubes, shown in FIG. 4 (A-C).

Figure 3A:
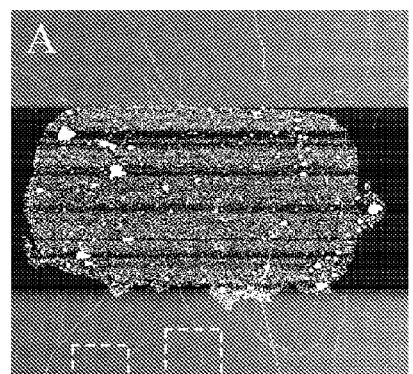
FIGS. 3 (A)-(C) are tapping-mode AFM images of the nanotubes on $SiO_2$/Si surface before etching with $CO_2$.
Figure 3B:
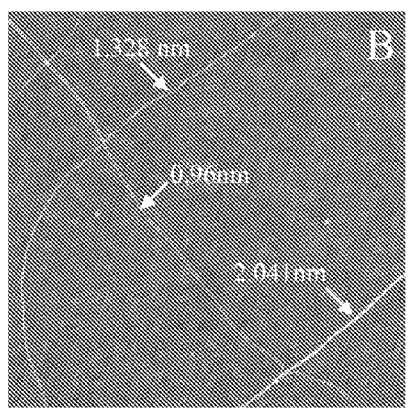
Figure 3C:
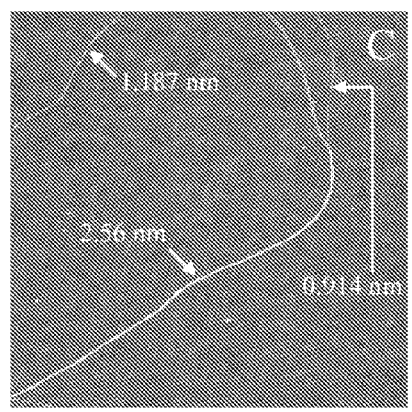
Figure 5A:
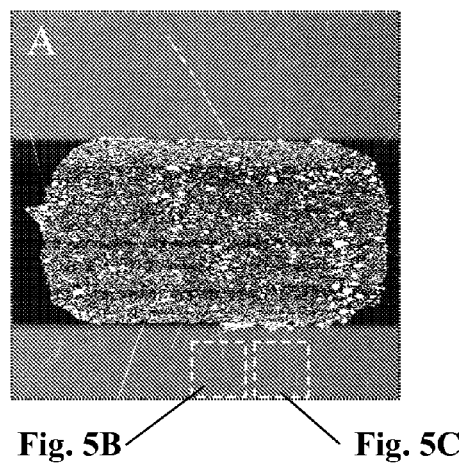
FIGS. 5 (A)-(C) are tapping-mode AFM images of the nanotubes before treatment with $CO_2$.
Figure 5B:
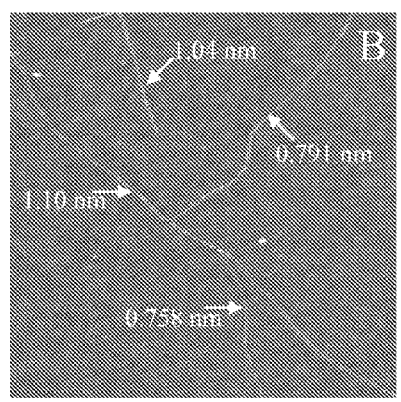
Figure 5C:
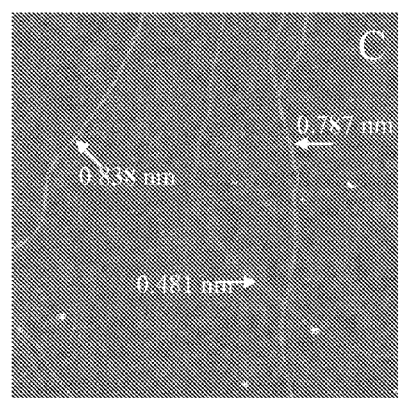
Figure 5D:
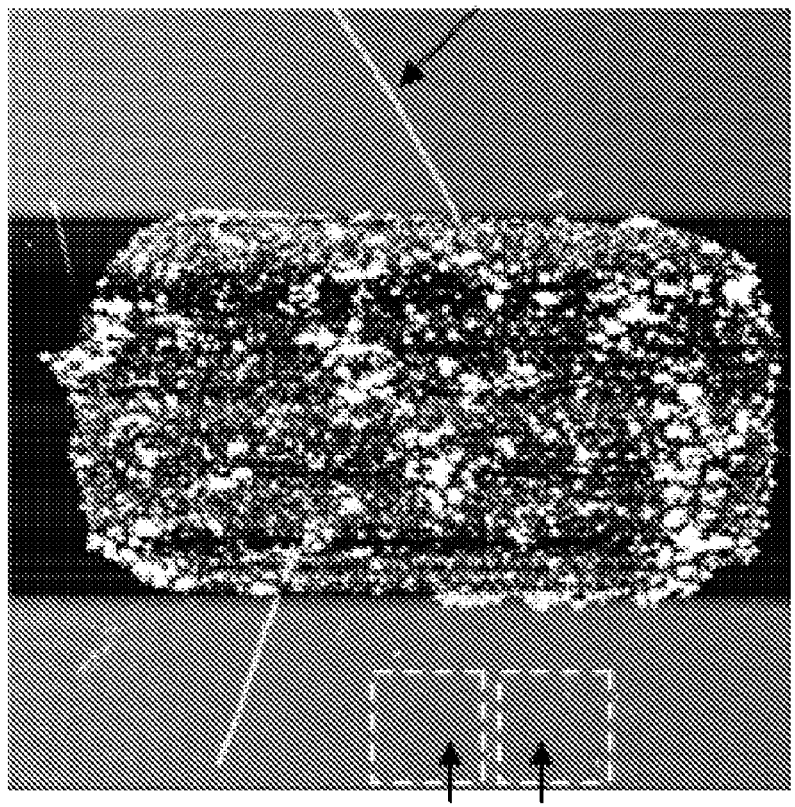

It can be seen upon comparison of FIGS. 3 and 4 that at 700° C. the small diameter nanotubes are more reactive with $CO_2$ than the large diameter nanotubes.

Example 4

The procedure described in Example 3 was repeated except that the nanotubes were etched with $CO_2$ for 15 minutes. The chip was characterized with AFM before and after the etching process, shown in FIG. 5.

FIGS. 5 (A-C) show two large diameter nanotubes (2.634 and 3.712 nm) along with small diameter nanotubes (from 0.481 to 1.10 nm). After treatment with $CO_2$, FIG. 5(D) shows that the small diameter nanotubes were etched whereas the large diameters were not.

What is claimed is:

1. A method, for the production of a population of single-walled nanotubes having a minimum diameter comprising:
   a) placing a plurality of single walled carbon nanotubes of varying diameters under an inert atmosphere;
   b) heating the single walled carbon nanotubes to a temperature of above 300° C.;
   c) adding carbon dioxide to the inert atmosphere until the atmosphere contains at least 10% by volume of carbon dioxide; and
   d) maintaining the temperature until only single walled carbon nanotubes of having a minimum diameter remain.

2. The method of claim 1 wherein the inert atmosphere contains at least 1% by volume of water.

3. The method of claim 2 wherein the inert atmosphere contains up to 10% by volume of water.

4. The method of claim 1 wherein the inert atmosphere contains less than $1\times10^{-8}$ torr of oxygen.

5. The method of claim 1 wherein the inert atmosphere comprises a gas selected from the group consisting of argon and nitrogen and mixtures thereof.

6. The method of claim 1 wherein the diameter is equal or greater than 2 nm.

7. The method of claim 1 wherein in step d) the temperature is maintained for between 10 and 60 minutes.

8. The method of claim 1 wherein in step b) the single walled carbon nanotubes are heated to a temperature of about 350° C. to about 900° C.

9. The method of claim 1 wherein in step b) the single walled carbon nanotubes are heated to a temperature of about 480° C. to about 900° C.

10. The method of claim 1 wherein the single walled carbon nanotubes are on a solid substrate.

11. The method of claim 1 additionally comprising the step:
   e) isolating the single walled carbon nanotubes of the minimum diameter.

* * * * *